INVENTOR
GEORGE T. DOWNEY
WILLIAM J. SAMPLE

BY *Craig & Antonelli*

ATTORNEYS

INVENTORS
GEORGE T. DOWNEY
WILLIAM J. SAMPLE

BY Craig & Antonelli

ATTORNEYS

United States Patent Office 3,451,551
Patented June 24, 1969

3,451,551
FREE-FLOW FILTER BYPASS VALVE
William J. Sample and George T. Downey, Corry, Pa.,
assignors to Aero-Flow Dynamics, Inc., Corry, Pa.
Filed Sept. 15, 1967, Ser. No. 668,102
Int. Cl. B01d 35/14, 27/10
U.S. Cl. 210—90
16 Claims

ABSTRACT OF THE DISCLOSURE

A filter assembly for liquids such as gasoline fuel, incorporating a bypass valve assembly including a valve body exposed on one side to the pressure of the fluid at the inlet portion of the filter assembly and, on the opposite side, to the pressure of the fluid at the outlet portion of the filter assembly, in addition to the force of a spring which acts upon the valve body to maintain the body in a seated position, and further incorporating a second pressure-responsive element, exposed, on one side, to the ambient pressure and, on the opposite side, to the pressure of the fluid at the inlet portion of the filter assembly, said second pressure-responsive element related to the valve body such that a pressure drop at the inlet portion of the filter assembly to a level below a predetermined minimum causes a force to be exerted against the valve body to unseat the valve body, allowing the flow of unfiltered fuel.

Background of the invention

The present invention relates to filter assemblies for fluids such as gasoline fuel, especially to filter assemblies which are provided with valves or the like to permit bypass flow of the fluid when the filter elements become clogged. More specifically, the present invention has particular application in the fuel systems of powered aircraft, which systems are subject to certain problems caused by operation at high altitude and corresponding low pressure.

Proceeding from the premise that it is critical to the operation of an aircraft engine that fuel be delivered to the engine driven fuel pump in a liquid state or, at least, in a high proportion of liquid to vapor, fuel systems commonly in use employ a boost pump, generally located in the lower portion of the fuel tank to permit gravity flow of fuel to said boost pump. The prime function of the boost pump is to pressurize the fuel and thus ensure the delivery of fuel to the inlet of the engine driven pump in a liquid state.

It can easily be seen that the demands of high altitude flight are such as to require extreme measures in order to prevent vaporizing of the fuel in its transfer from the fuel tank to the engine driven pump. Excessive vapor formation in the fuel lines reduces fuel flow to a level insufficient to sustain the operation of the engine. The likelihood of vapor formation is enhanced at higher altitudes since the atmospheric pressure acting upon the fluid is correspondingly reduced.

At high altitudes, it has been found that any restriction in the fuel path tends to generate fuel vapor. So long as the boost pump is operative, minor restrictions might not be critical. In case of boost pump failure, however, the extent of vapor generation becomes highly critical. Such boost pump failure might well occur at a time when the aircraft is operating at an altitude sufficiently great that the absolute pressure acting upon the fuel is less than that required to prevent vaporizing of the fuel. Since engine operation could not be maintained under such circumstances, the only remedy would be to dive to a lower altitude with an atmospheric pressure above the critical level.

Virtually all of the fuel systems currently in use in power aircraft incorporate a fuel filter assembly wherein normal fuel flow is directed to at least one filter element. As the filter elements accumulate contamination removed from the fuel stream, they gradually become clogged and offer an ever-increasing resistance to the free flow of fuel through the filter assembly. In order to maintain fuel flow, albeit at the cost of delivering unfiltered fuel to the engine, a pressure-responsive bypass valve assembly is normally provided so that when the pressure differential between the inlet and outlet sides of the fuel filter assembly reaches a predetermined level, some or all of the fuel flow is permitted to flow through an alternative path, avoiding the clogged filter elements.

It is extremely desirable to establish this predetermined level of pressure differential at which fuel flow is permitted by the bypass valve, commonly referred to as the "cracking pressure," as high as possible, since a high cracking pressure implies a relatively great capacity of the filter elements for the retention of contamination. However, a high cracking pressure also entails a high pressure drop through the bypass valve, which can be tolerated only if the pressure of the fuel at the outlet of the filter assembly is sufficiently high to maintain the fuel in a liquid state. Consequently, currently used fuel filter assemblies and the bypass valves used therein necessarily represent a compromise between the allowable pressure drop through the bypass valve at rated flow conditions and the contamination-retaining capacity of the filter elements, with the attendant pressure drop resulting therefrom.

The compromise mentioned above is still further affected by the necessity that a fuel system in powered aircraft be designed so as to function effectively despite an inoperative boost pump. This last-mentioned factor severely limits the allowable magnitude of the pressure drop through the bypass valve. Accordingly, it should be evident that a low bypass valve cracking pressure necessarily entails the use of a relatively large filter element.

Summary of the invention

The problem presented above is solved by the present invention in a manner which expands the physical boundaries of operation of a fuel filter assembly and a bypass valve assembly therefor, to minimize the effects of a failed boost pump. In accordance with the present invention, a pressure-responsive member, such as a flexible diaphragm, is disposed so as to be exposed on one side thereof to the fuel line pressure at the inlet of the fuel filter assembly and, on the opposite side thereof, to the ambient air presure. So long as the fuel line pressure remains above a predetermined level, the diaphragm or the like retains a compression spring in an inoperative position. In the event, however, that the fuel line pressure falls below this predetermined level, as might occur as a result of a failed boost pump, the pressure-responsive member permits the compression spring to exert its force upon the bypass valve body to urge the bypass valve to an open position, thus providing an override effect upon the otherwise normally operating bypass valve assembly. The incorporation of this override device allows for the use of filter elements smaller by comparison with those of prior art filter assemblies to effectuate equivalent filtration capacity.

Similarly, the use of this override feature permits the use of relatively small bypass valve assemblies and, of extreme significance, permits operation at higher altitudes with a failed boost pump.

Accordingly, it is an object of the present invention to provide a fuel filter assembly of the type described above, having a bypass valve assembly with a relatively high cracking pressure for a correspondingly small filter element.

Another object of the present invention resides in the provision of an override feature in a bypass valve assembly for a fuel filter assembly of the type described above, which enables operation of an aircraft power plant at higher altitudes with a failed boost pump.

Still another object of the present invention is to provide a fuel filter assembly with a relatively small bypass valve assembly in comparison with those of the prior art filter assemblies.

Finally, it is an object of the present invention to provide a fuel filter assembly of the type described above, having a bypass valve assembly which expands upon the permissible physical boundaries of operation and overcomes the difficulties encountered with the known filter assemblies of this general type.

These and other objects, features and advantages of the present invention will become more apparent from the following description, when considered in view of the accompanying drawings, which show, for purposes of illustration only, two embodiments in accordance with the present invention, and wherein.

Figure 1:
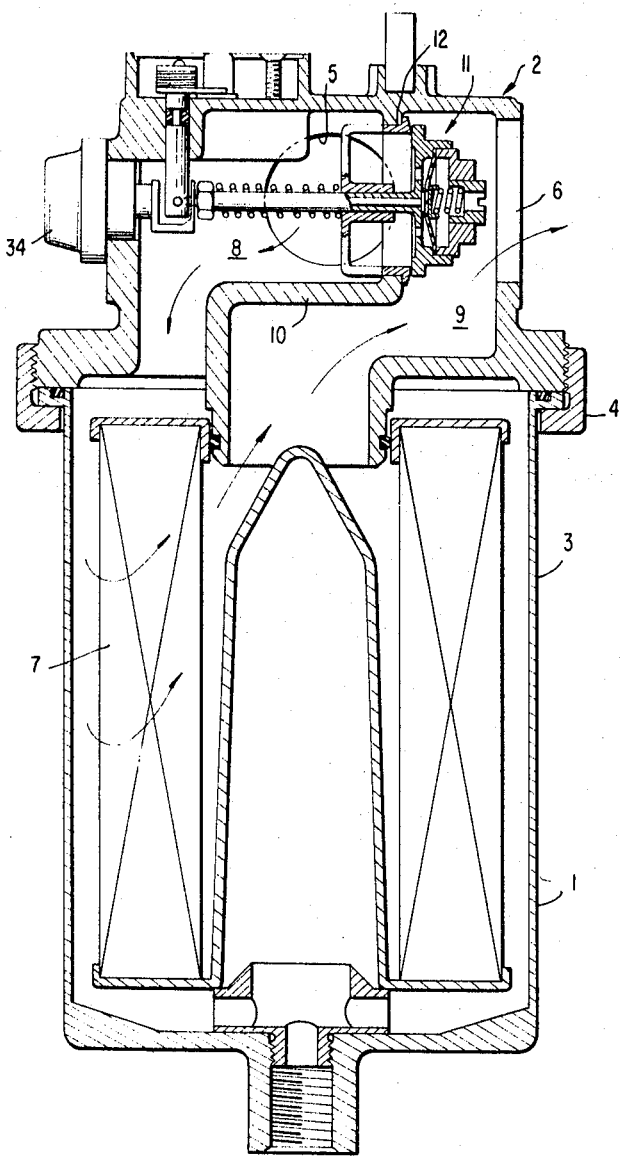
FIGURE 1 is an elevation view, partially in section, of a fuel filter assembly of the general type contemplated by the present invention.

Referring now to the drawings, wherein like reference numerals are used throughout to designate like parts, a fuel filter assembly generally indicated at 1 is illustrated as having a top casing member 2 and a lower casing member 3 releasably secured to the member 2 by a suitable coupling 4. An inlet port for the fluid to be filtered is generally designated at 5 and an outlet part therefor at 6. Removable filter elements 7, of conventional construction, are provided within the normal path of fluid flow through the filter assembly, which is indicated generally by the arrows in FIGURE 1. The top casing member 2 is divided into an inlet chamber 8 and an outlet chamber 9 by an integral partition 10. The partition 10 is formed to provide for a passage for fluid downwardly around its lower portion and upwardly into the outlet chamber 9, as illustrated in FIGURE 1.

A by pass valve assembly, generally designated as 11, is provided in an aperture 12 of partition 10 to control the passage of fluid between chambers 8 and 9. The valve assembly, as seen most clearly in FIGURES 2, 3 and 4, includes a hollow stem 13 which is integral with a valve body 14. Valve body 14 includes a rim portion 15 defining a recess 16. Positioned within recess 16 is a pressure-responsive diaphragm and plunger assembly, including a diaphragm 17 connected by suitable means to one end of a plunger 18. The plunger 18 extends through the hollow valve stem 13 and is freely slidable therein. The diaphragm 17 is secured in position by an insert 19, which is affixed, by suitable means, to the rim portion 15 of the valve body 14. A plug 20, having a recess 21 therein, is held in position within the insert 19. A coil spring 22 is seated at one end against the inner surface of plug 20 in recess 21. The other end of the spring 22 is seated in a recess 23, formed in a guide member 24, which is rigidly attached to the diaphragm 17. Thus, the spring 22 serves to apply pressure to the surface area of diaphragm 17 to bias the toward the left, as viewed in FIGURES 2, 3 and 4. A valve housing 25, provided at one end with a valve seat 26, is further provided with a plurality of ports 27. These ports, in combination with a plurality of ports 28, provided in valve body 14, admit pressurized fluid from the inlet chamber 8 to contact the surface of diaphragm 17.

Surrounding hollow stem 13 of valve body 14 is a compression spring 29. One end of spring 29 abuts valve housing 25. At its opposite end, spring 29 abuts stop member 30, fixed adjustably on valve stem 13. Thus, spring 29 serves to apply pressure to the rear surface of valve housing 25, acting to bias valve body 14 to the left, as viewed in FIGURES 2, 3 and 4.

Figure 2:
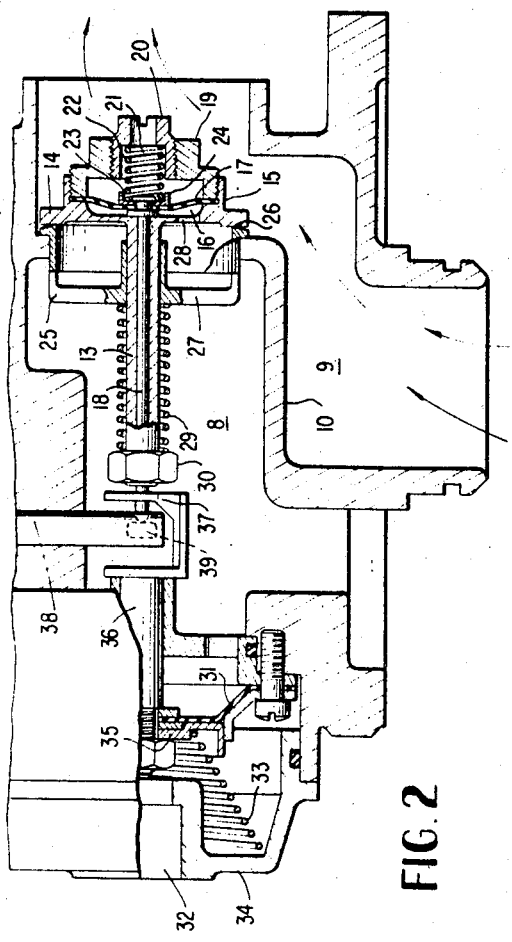
FIGURE 2 is an enlarged view, partially in section, illustrating the details of a bypass valve assembly in accordance with the present invention wherein the bypass valve is in a closed position.
Figure 3:
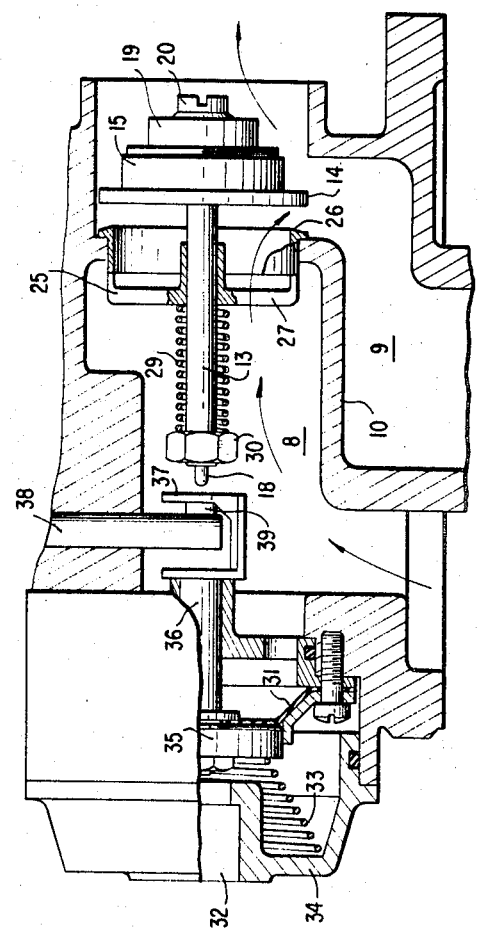
FIGURE 3 is a view generally similar to FIGURE 2, but wherein the bypass valve is in an open position as caused, for example, by clogged filter elements.
Figure 4:
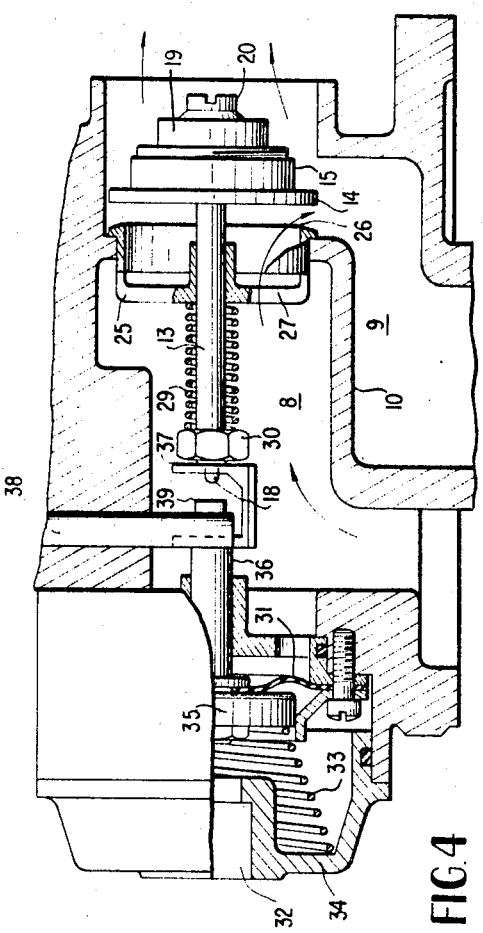
FIGURE 4 is a view generally similar to FIGURE 2, but wherein the bypass valve is in an open position as caused, for example, by a failed boost pump.

As seen in FIGURES 2, 3 and 4, a second pressure-responsive member, such as a flexible diaphragm 31, is positioned so as to be exposed on one side thereof to the fluid pressure at the filter assembly inlet chamber 8 and, on the opposite side thereof, to the ambient air pressure through a venting port 32, provided in the outer wall of the fuel filter assembly. Flexible diaphragm 31, in its normal position, as indicated in FIGURES 2 and 3, retains compression spring 33 in an inoperative or compressed state. Compression spring 33 is disposed between fixed end cap 34 of the fuel filter assembly and cylindrical member 35. Cylindrical member 35, in turn, is rigidly secured to a slidable shaft 36, which is constrained to reciprocate in a line coaxial with plunger 18 and hollow stem portion 13. At its forward end, shaft 36 is provided with an abutment surface 37, which is constructed in a yoke-like configuration so as to avoid contacting the end of plunger 18, while positively engaging stop member 30 on hollow stem 13 when the shaft 36 is in a forwardly disposed position, as shown in FIGURE 4.

Figure 2A:
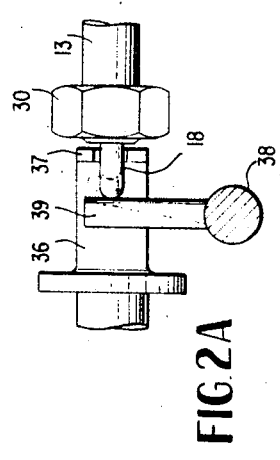
FIGURE 2A is a view taken along the line A—A of FIGURE 2.
Figure 3A:
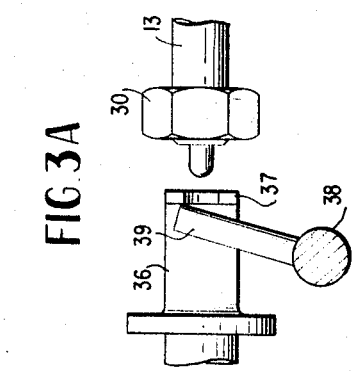
FIGURE 3A is a view taken along the line A—A of FIGURE 3.
Figure 4A:
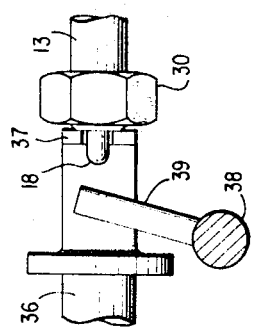
FIGURE 4A is a view taken along the line A—A of FIGURE 4.

Associated with the end of plunger 18 is a crank arm 39, rigidly secured to a vertically-disposed rotatable shaft 38, as seen most clearly in FIGURES 2A, 3A and 4A. Crank arm 39 is arranged at a height which causes it to engage with the end of plunger 18 and is biased, as by means of a torsional spring (not shown), to effect such positive engagement at all times. The upper portion of the shaft 38 is adapted, by means not shown in the drawings, to activate suitable mechanical or electrical signalling devices upon a rotation of the shaft in the clockwise direction, as viewed in FIGURES 2A, 3A and 4A, through an angular distance greater than a predetermined arc length. The specific details of the indicating devices are not shown herein as these do not form a part of the present invention.

Figure 5:
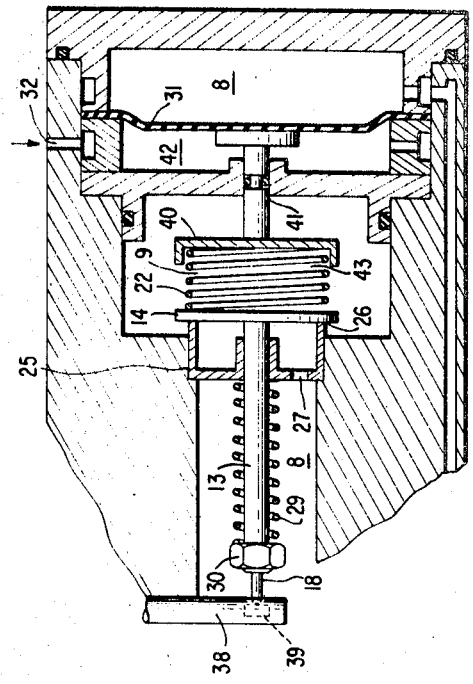
FIGURE 5 is an enlarged view diagrammatically illustrating a bypass valve assembly according to an alternative embodiment of the present invention.

According to an alternative embodiment of the present invention, as indicated diagrammatically in FIGURE 5, spring 22 abuts the surface of valve body 14 at one end thereof, and, at the opposite end thereof, is secured within a recess in a guide member 40, which is secured directly, by means of shaft 41, to flexible diaphragm 31, which is disposed between a chamber in communication with the inlet chamber 8 of the fuel filter assembly and a chamber 42 in communication with venting port 32 and thus containing air at ambient pressure.

*Operation*

The operation of the fuel filter assembly, as shown by FIGURES 1, 2, 2A, 3, 3A, 4 and 4A, is as follows:

Under normal operating circumstances, with the filter elements 7 in a clean condition, and the boost pump (not shown) operative, pressurized fluid enters the filter assembly, in liquid state, through the inlet port 5 and is received in the inlet chamber 8. After passing through the filter elements 7, the fluid passes to the outlet chamber 9 and out of the fuel filter assembly through outlet port 6, generally as indicated by the flow lines in FIGURE 1, to the engine driven pump (not shown). Under these conditions, a relatively slight pressure differential is exerted upon diaphragm 17. Thus, the combined springs loads of coil springs 22 and 29 are sufficient to retain plunger 18 in a retracted position and valve body 14 firmly seated upon valve seat 26, as shown in FIGURE 2.

With the boost pump fully operative, the fluid pressure at the inlet chamber 8 of the fuel filter assembly is sufficiently high to maintain the fuel in a liquid state. Accordingly, the force exerted by fuel line pressure exceeds the force exerted by ambient pressure by an amount greater than the force of compression spring 33. Thus, flexible diaphragm 31 retains compression spring 33 in a compressed state and shaft 36 remains in its retracted position, as indicated in FIGURE 2, with abutment surface 37 disengaged from stop member 30.

With valve body 14 firmly seated, plunger 18 acts upon crank arm 39 to retain the arm in the counterclockwise position, as indicated in solid lines in FIGURE 2A. With crank arm 39 in this position, the indicating means (not shown) are in an inoperative mode.

As the filter elements 7 become clogged with contamination, fluid pressure on the outlet side of diaphragm 17 decreases correspondingly. Eventually, when the force generated by the pressure differential between the inlet and outlet chambers reaches a magnitude exceeding the force exerted by coil spring 22, flexible diaphragm 17 is urged to the right, as viewed in FIGURE 3. Here, it is to be noted that as plunger 18 moves to the right, as seen in FIGURES 3 and 3A, crank arm 39 rotates in a clockwise direction under the influence of, for example, a torsional spring (not shown) acting upon shaft 38. As a predetermined limit of arcuate travel is reached, as indicated in FIGURE 3A, suitable indicating means associated with the upper end of shaft 38 are activated to signal a condition of impending bypass flow.

Ultimately, the fluid pressure on the outlet side of diaphragm 17 decreases to such an extent that the pressure on the inlet side of the diaphragm 17 exceeds the pressure on the outlet side by an amount equal to the cracking pressure. At this point, the force exerted by the pressure differential between the inlet and outlet chambers exceeds the combined force of coil springs 22 and 29. When the cracking pressure has been reached, valve body 14 moves to the right, as illustrated in FIGURE 3, thus allowing flow of unfiltered fuel through aperture 12 of partition 10. This bypass flow has the effect of increasing the fluid pressure at the outlet chamber 9 to a level sufficient to ensure that the fuel reaching the engine driven pump is in a liquid state or, at least, in a high proportion of liquid to vapor.

If the boost pump should become inoperative for any reason, the fluid pressure at the inlet chamber 8 may well decrease sharply to a level insufficient to maintain the fuel in a liquid state. According to the fuel filter assembly as illustrated in FIGURES 4 and 4A, boost pump failure is compensated for by flexible diaphragm 31, compression spring 33 and shaft 36. In the event of boost pump failure, fluid pressure at the inlet chamber 8 decreases to a point at which it is exceeded by the combined effect of the ambient pressure and the force of compression spring 33. When this occurs, flexible diaphragm 31 is moved to the right, as seen in FIGURE 4. Correspondingly, compression spring 33 extends, moving cylindrical member 35, and thus shaft 36, forward (to the right, as viewed in FIGURE 4). Abutment surface 37 of shaft 36 engages with stop member 30 on valve stem 13, urging valve stem 13 and valve body 14, rigidly attached thereto, to the right, thus unseating valve body 14 from valve seat 26 and allowing the flow of unfiltered fuel through aperture 12. Thus, it can clearly be seen that flexible diaphragm 31, compression spring 33 and shaft 36, acting conjointly, serve as an override device to unseat bypass valve body 14, permitting the passage of unfiltered fue upon a sharp pressure drop at the fuel filter assembly inlet chamber 8 as might be caused, for example, by a failure of the boost pump. It should be noted that in the event of a sharp drop in the fluid pressure on the inlet side of the fuel filter, the critical value of pressure drop across the fuel filter, or the cracking pressure, may be reached, thus causing valve body 14 to become unseated despite the fact that the filter elements 7 are in a relatively clean condition.

As seen in FIGURE 4A, the activation of the above-described override device, which results in a sliding motion of shaft 36 to the right, also allows crank arm 39 to rotate in a clockwise direction until it reaches the position shown. In this position, the indicating means are activated to signal a condition of bypass flow of fuel, in the manner described above with reference to FIGURE 3A.

In the alternative embodiment of the present invention, as shown in FIGURE 5, it can readily be seen that a sharp decrease in fluid pressure at the fuel filter assembly inlet chamber 8, as might occur as a result of a failure of the boost pump, results in a movement of flexible diaphragm 31, and ultimately valve body 14, to the right, thus unseating valve body 14 and permitting bypass flow of fuel.

While we have shown and described two embodiments in accordance with the present invention, it is understood that the same is not limited thereto, but is susceptible of numerous changes and modifications as known to a person skilled in the art, and we therefore do not wish to be limited to the details shown and described therein, but intend to cover all such changes and modifications as are encompassed by the scope of the appended claims.

We claim:

1. A bypass valve assembly for use in fluid filters, comprising: a valve seat, a pressure-responsive valve body exposed, on one side, to the pressure of fluid at the inlet of the fluid filter and, on the opposite side thereof, to the pressure of fluid at the fluid filter outlet, said valve body being resiliently biased to remain in firm engagement with said valve seat until the fluid pressure at the filter inlet exceeds the fluid pressure at the filter outlet by some predetermined level of pressure differential, pressure responsive means exposed, on one side, to the pressure of fluid at the fluid filter inlet and, on the other side thereof, to the ambient pressure, and means for operatively connecting said pressure-responsive means with said valve body such that said valve body is disengaged from said valve seat if the fluid pressure at the fluid filter inlet falls below a predetermined minimum level.

2. A bypass valve assembly according to claim 1, further comprising means to activate signalling means to indicate a condition wherein said valve body is disengaged from said valve seat.

3. A bypass valve assembly according to claim 1, wherein said pressure-responsive means comprises a flexible diaphgram.

4. A bypass valve assembly according to claim 3, wherein said means for operatively interconnecting said pressure-responsive means with said valve body comprises a compression spring secured, at one end thereof, to the side of said valve body exposed to the pressure of the fluid at the fluid filter outlet and, at the opposite end thereof, to a slidable shaft which is rigidly secured to the side of said flexible diaphragm exposed to the ambient pressure.

5. A bypass valve assembly according to claim 4, further comprising means to activate signalling means to indicate a condition wherein said valve body is disengaged from said valve seat.

6. A bypass valve assembly according to claim 3, wherein said means for operatively connecting said pressure-responsive means with said valve body comprises a first longitudinally slidable shaft, rigidly secured, at one end thereof, to the side of said valve body exposed to the pressure at the fluid filter inlet, a second longitudinally slidable shaft axially aligned with said first shaft and adapted to engage therewith at the opposite end thereof, and a compression spring retained by said flexible diaphragm under normal conditions, but adapted to engage the opposite end of said second shaft and cause said valve body to be disengaged from said valve seat when the combined forces exerted by the ambient pressure and by said compression spring exceed the magnitude of the force exerted by the pressure of the fluid at the fluid filter inlet.

7. A bypass valve assembly according to claim 6, further comprising means to activate signalling means to indicate a condition wherein said valve body is disengaged from said valve seat.

8. A bypass valve assembly according to claim 7, wherein said means to activate signalling means comprises a second flexible diaphragm, exposed on one side thereof, to the pressure of fluid at the fluid filter inlet and, on the opposite side thereof, to the pressure of fluid at the fluid filter outlet, a plunger rigidly secured to said second flexible diaphragm, and a vertically disposed rotatable shaft having a crank arm fixed rigidly thereto and extending radially therefrom, said crank arm being aligned vertically on said vertically disposed rotatable shaft to engage with the free end of said plunger.

9. Filter means for fluids such as gasoline fuel, comprising: top casing means having a venting port therein, removable lower casing means, fluid inlet means and fluid outlet means, at least one removable filter element positioned between said fluid inlet means and said fluid outlet means, and a bypass assembly including a valve, exposed, on one side thereof, to the pressure of fluid on the inlet side of said filter elements and, on the other side thereof, to the pressure of fluid on the outlet side of said filter elements, and pressure-responsive means operatively interconnected with said valve, said pressure-responsive means exposed, on one side thereof, to the pressure of fluid on the inlet side of the filter elements and, on the other side thereof, to the ambient pressure.

10. Filter means according to claim 9, wherein said valve is spring-biased on the side of said valve exposed to the pressure of the fluid on the inlet side of said filter elements, thus tending to retain said valve in a closed position.

11. Filter means according to claim 9, wherein said pressure-responsive means connected with said valve comprises a flexible diaphragm spring-biased on the side of said diaphragm exposed to the ambient pressure, thus tending to open said valve if the force exerted by the pressure of fluid on the inlet side of said filter elements falls below a level equal to the force exerted by the ambient pressure in combination with the force of the spring-bias.

12. Filter means according to claim 9, wherein the side of said valve exposed to the pressure of fluid on the outlet side of said filter elements is connected with the side of said pressure-responsive means exposed to the ambient pressure by means of a shaft and a compression spring aligned at one end of said shaft and positively engaging therewith.

13. Filter means according to claim 9, further comprising means operatively connecting said by pass assembly with means for indicating an open condition of said bypass valve.

14. Filter means according to claim 13, wherein the side of said valve exposed to the pressure of fluid on the outlet side of said filter elements is connected with the side of said pressure-responsive means exposed to the ambient pressure by means of a shaft and a compression spring aligned at one end of said shaft and positively engaging therewith.

15. Filter means according to claim 13, wherein said means for operatively connecting said bypass assembly with means for indicating an open condition of said bypass valve includes a second pressure-responsive means positioned so as to be exposed on one side thereof to the pressure of the fluid on the inlet side of said filter elements and, on the other side thereof, to the pressure of the fluid on the outlet side of said filter elements.

16. Filter means according to claim 15, wherein said first pressure responsive means connected with said valve comprises a flexible diaphragm, spring-biased on the side of said diaphragm exposed to the ambient pressure, thus tending to open said valve if the force exerted by the pressure of fluid on the inlet side of said filter elements falls below a level equal to the force exerted by the ambient pressure in combination with the force of the spring bias.

References Cited
UNITED STATES PATENTS

| | | | |
|---|---|---|---|
| 2,998,138 | 8/1961 | Mould et al. | 210—90 |
| 3,331,509 | 7/1967 | Gray | 210—90 |

REUBEN FRIEDMAN, *Primary Examiner.*

FRANK A. SPEAR, JR., *Assistant Examiner.*

U.S. Cl. X.R.

210—133, 134